US012627884B2

(12) United States Patent  
Hewicker et al.

(10) Patent No.: US 12,627,884 B2  
(45) Date of Patent: May 12, 2026

(54) METHOD FOR CARRYING OUT A SETTING OPERATION OF A CONTAINER INSPECTION APPARATUS AND CONTAINER INSPECTION APPARATUS

(71) Applicant: KRONES AG, Neutraubling (DE)

(72) Inventors: Alexander Hewicker, Wörth an der Donau (DE); Christof Will, Obertraubling (DE)

(73) Assignee: KRONES AG, Neutraubling (DE)

( * ) Notice: Subject to any disclaimer, the term of this patent is extended or adjusted under 35 U.S.C. 154(b) by 193 days.

(21) Appl. No.: 18/720,932

(22) PCT Filed: Nov. 21, 2022

(86) PCT No.: PCT/EP2022/082601

§ 371 (c)(1),  
(2) Date: Jun. 17, 2024

(87) PCT Pub. No.: WO2023/110301

PCT Pub. Date: Jun. 22, 2023

(65) Prior Publication Data

US 2025/0071418 A1    Feb. 27, 2025

(30) Foreign Application Priority Data

Dec. 15, 2021    (DE) ..................... 10 2021 133 159.5

(51) Int. Cl.  
H04N 23/667 (2023.01)  
H04N 17/00 (2006.01)

(52) U.S. Cl.  
CPC ......... H04N 23/667 (2023.01); H04N 17/002 (2013.01)

(58) Field of Classification Search  
CPC ........................... H04N 23/667; H04N 17/002  
(Continued)

(56) References Cited

U.S. PATENT DOCUMENTS 5,202,932 A    4/1993  Cambier et al.  
6,172,748 B1    1/2001  Sones et al.  
(Continued)

FOREIGN PATENT DOCUMENTS

DE    202004007783 U1    9/2005  
DE    102014106992 A1    11/2015  
(Continued)

OTHER PUBLICATIONS

De Koning, "Optimisation of the weight stabilisation system at Jacobs Douwe Egberts", Master Thesis, University of Twente, Apr. 2021, 130 pgs.

(Continued)

*Primary Examiner* — Joel W Fosselman  
(74) *Attorney, Agent, or Firm* — HAYES SOLOWAY P.C.

(57) ABSTRACT

A method for carrying out a setting mode of a container inspection apparatus including the following steps: a plurality of spatially resolved sensor data detected by the sensor device is stored on a non-volatile storage device, which is retrieved by a setting device in the setting mode; the setting device is provided with a set of test evaluation parameters, which are to be assessed in terms of a working mode of the container inspection device, in which the set of test evaluation parameters is set as a set of real-time evaluation parameters in the real-time evaluation device; for assessing the set of test evaluation parameters, the setting device determines at least one statistical assessment variable on the basis of the retrieved plurality of spatially resolved sensor data.

20 Claims, 1 Drawing Sheet

(58) Field of Classification Search
USPC .................................................... 348/207.99
See application file for complete search history.

(56) References Cited

U.S. PATENT DOCUMENTS

| | | | |
|---|---|---|---|
| 2009/0033761 A1* | 2/2009 | Cetrulo | H04N 23/56 |
| | | | 348/222.1 |
| 2018/0288372 A1 | 10/2018 | Kirzinger | |
| 2019/0022915 A1 | 1/2019 | Zoelfl et al. | |
| 2020/0242796 A1 | 7/2020 | Yamada et al. | |
| 2021/0003512 A1 | 1/2021 | Sosman et al. | |
| 2021/0035276 A1 | 2/2021 | Ago et al. | |
| 2021/0116387 A1 | 4/2021 | Hewicker | |
| 2022/0051019 A1 | 2/2022 | Okamura | |
| 2022/0269259 A1 | 8/2022 | Albrecht et al. | |
| 2023/0003665 A1 | 1/2023 | Will | |
| 2023/0175976 A1 | 6/2023 | Kolb et al. | |
| 2023/0177671 A1 | 6/2023 | Hewicker et al. | |
| 2023/0236057 A1 | 7/2023 | Piana et al. | |

FOREIGN PATENT DOCUMENTS

| | | | |
|---|---|---|---|
| DE | 102006043466 B4 | 4/2017 | |
| DE | 102019205652 A1 | 10/2020 | |
| DE | 102019119352 A1 | 1/2021 | |
| DE | 102019131638 A1 | 5/2021 | |
| DE | 102019132654 A1 | 6/2021 | |
| DE | 102020111254 A1 | 10/2021 | |
| EP | 0483966 A2 | 9/1991 | |
| EP | 1099948 A2 | 5/2001 | |
| EP | 3420418 A1 | 1/2019 | |
| WO | WO2007115795 A1 | 10/2007 | |
| WO | WO2012054655 A1 | 4/2012 | |
| WO | WO2017201398 A1 | 11/2017 | |
| WO | WO2019040859 A1 | 2/2019 | |
| WO | WO2020226921 A1 | 11/2020 | |
| WO | WO2021213779 A1 | 10/2021 | |
| WO | WO2021213832 A1 | 10/2021 | |

OTHER PUBLICATIONS

"Conveyor Simulation", https://web.archive.org/web/20180825025814/ https://www.createasoft.com/conveyor-simulation, from Aug. 25, 2018, 8 pgs.

Wang, et al., "Machine vision intelligence for product defect inspection based on deep learning and Hough transform", Journal of Manufacturing Systems, vol. 51, Apr. 12, 2019, pp. 52-60, 9 pgs.

German Search Report issued in DE Patent Appln. No. 102021133159. 5, dated Sep. 1, 2022, with machine English translation, 12 pgs.

International Search Report and Written Opinion issued in PCT/ EP2022/082601, dated Feb. 22, 2023, with English translation, 22 pgs.

German Search Report issued in DE Patent Appln. No. 102021133164. 1, dated Sep. 6, 2022, with machine English translation, 9 pgs.

German Examination Report issued in DE Patent Appln. No. 102021133164.1, dated Oct. 13, 2022, with machine English translation, 9 pgs.

International Search Report and Written Opinion issued in PCT/ EP2022/082592, dated Mar. 14, 2023, with English translation, 19 pgs.

Appeal filed in DE Patent Appln. No. 102021133164.1, dated Nov. 23, 2023, with machine English translation, 35 pgs.

Appeal filed in DE Patent Appln. No. 102021133164.1, dated Nov. 23, 2023, with machine English translation, 37 pgs.

* cited by examiner

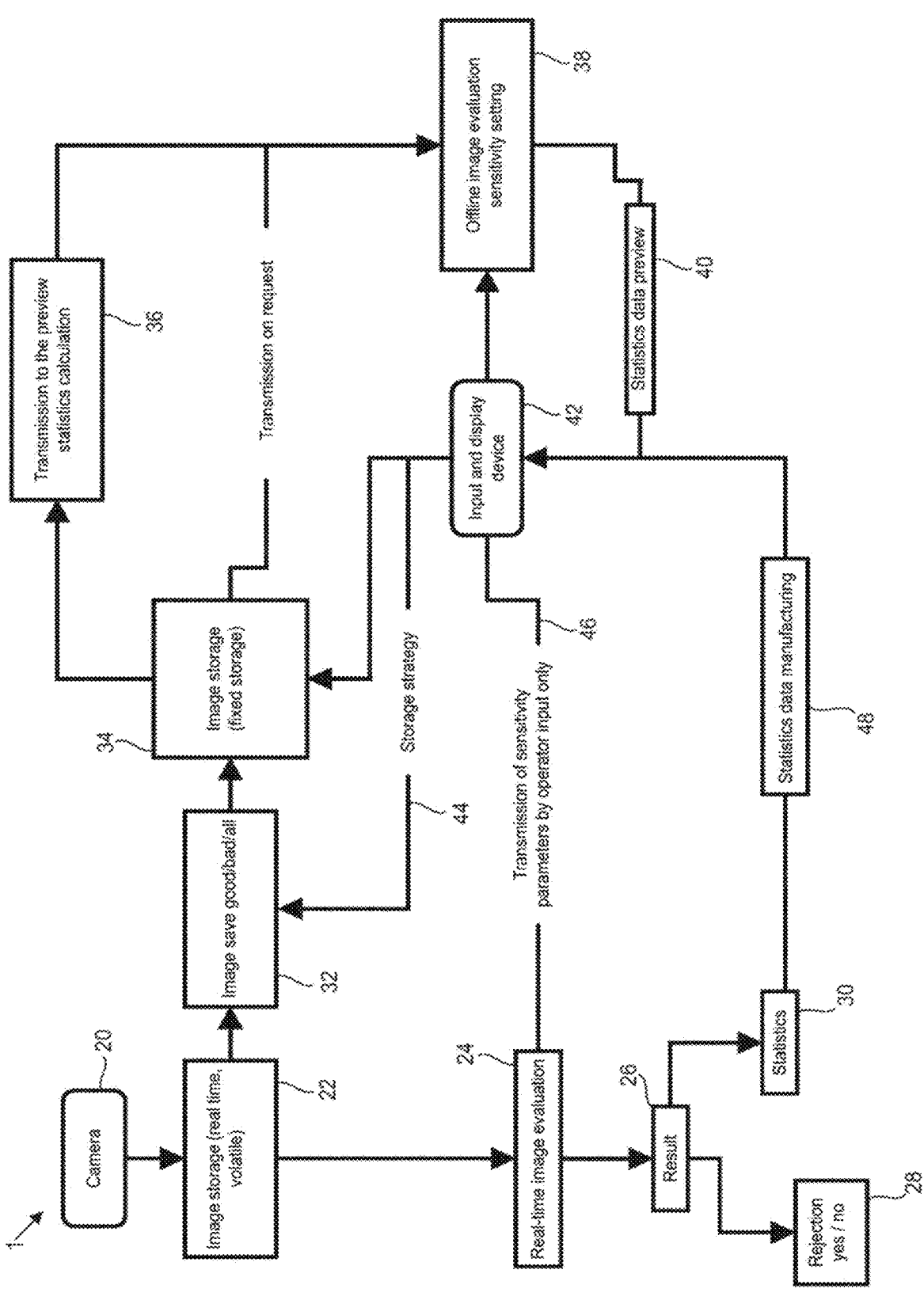

METHOD FOR CARRYING OUT A SETTING OPERATION OF A CONTAINER INSPECTION APPARATUS AND CONTAINER INSPECTION APPARATUS

The present invention relates to a container inspection apparatus for inspecting containers and a method for adjusting, in particular for fine adjustment, a container inspection apparatus. The container inspection apparatus has at least one transport device for transporting containers to be inspected as a container stream along a predetermined transport path, and at least one sensor device, such as a camera, in particular for the optical detection of spatially resolved sensor data, such as image data, in relation to a container to be inspected in the container stream. The containers are preferably plastic containers (in particular PET containers), containers whose main component consists of pulp and/or glass containers and/or cans. The containers may be containers from the beverage and/or food and/or cosmetics industries. For example, they can be cans or bottles, such as glass bottles, pulp bottles and plastic bottles.

Such container inspection apparatus has been known from the prior art for some time.

An inspection apparatus for inspecting containers and an image evaluation device is known from DE 20 2004 007 783 U1 of the applicant.

EP 1 099 948 A2 of the applicant further discloses an apparatus for optical inspection with an image evaluation system, in which an analysis system with an image evaluation program is provided for the analysis of defect images obtained, which substantially corresponds to that of the image evaluation system and with which selected image data are analyzed.

In the construction of systems comprising at least one apparatus for the inspection of containers in a container stream, specifications must be observed in accordance with which a guaranteed contamination variable (or more generally a container state variable) is to be discharged. It is also common practice to increase the detection accuracy of the inspection machine or container inspection apparatus until a false rejection rate desired or accepted by the operator is reached. The inspected containers of the container stream are preferably transported to a rejection device, which rejects the containers to be rejected (in accordance with the inspection result).

A false rejection rate is understood in particular to be the ratio of containers rejected by the rejection device (in particular undesirably by the operator of the container inspection apparatus), which have no damage or contamination or in particular further undesirable defects or undesirable properties, to a total container intake of the machine (or here the container inspection apparatus). A value of up to 0.1% (per camera unit) is usually tolerated, depending on the inspection unit or container inspection apparatus.

However, the total rejection rate cannot be chosen arbitrarily because the inspection machine or container inspection apparatus must produce faster by the amount of rejected containers in order not to negatively influence the line efficiency. The overall rejection rates are normally less than 5%, but can reach 10% for a few seconds. However, such an overall rejection rate suitable for production can generally only be set during production operation with the aid of image evaluation parameters, taking into account the bottle quality to be processed.

This means that after the construction of a system and after the start of production, a technician must actually remain on location for a longer period of time in order to adjust the image evaluation parameters in such a manner that the maximum achievable detection accuracy is achieved, taking into account the maximum specified false rejection rate. This is particularly true in view of the fact that a container treatment system almost always has to process several container types and the parameterization process must be carried out individually for each type, taking the rate into account.

It is known from the internal prior art that a camera system runs a set of sensitivity parameters in manufacturing (real time). At the same time, ROI (region of interest) changes, parameter (changes) and sensitivity changes can be made without affecting the real-time part. The necessary images can either be "fetched" from the current manufacturing process or from a storage that has previously been loaded with production images. Only when the configurator decides that the parameterization is appropriate, he saves it, i.e., the "offline" parameterization is transferred to manufacturing.

How these parameters behave, in particular with regard to false rejection (rate), can only be determined during production, because with a target false rejection rate of <0.1% (per camera), more than 5000 containers (for example approximately 5000-30000 containers in manufacturing) should be inspected in order to be able to recognize a trend.

Image processing in inspection machines or container inspection apparatus currently has to be adapted to each production type (of containers produced) by adjusting (evaluation) parameters. Such an adjustment is usually carried out by a configurator (mentioned above) or an operator. This is done in two repetitive steps: The first step consists of adjusting the (evaluation) parameters. The second step consists of production monitoring and assessing the change in rejection rate and inspection performance. These two steps are repeated until a satisfactory inspection performance is achieved.

The apparatuses and methods currently known from the prior art have the disadvantage that the configurator is dependent on manufacturing taking place in the second step, the assessment of the inspection performance. Without manufacturing, the effect of the last parameter change, which took place in step one, cannot be assessed.

During the commissioning of a new filling line, manufacturing is irregular, intermittent and in small batches. The configurator or operator must therefore spend a lot of time assessing the rejection rate and inspection performance. The finer the adjustment of the parameters becomes, the more manufacturing needs to be observed in order to assess the increasingly smaller effects. It is hardly possible to adjust parameters in varieties that are not produced at all or only rarely, as an assessment is only possible during the next manufacturing of the variety.

The object of the present invention is to overcome the disadvantages known from the prior art and to provide a container inspection apparatus and a method for performing an adjustment operation of a container inspection apparatus, in which the above-described production observation time of the container inspection apparatus can be shortened when the container inspection apparatus is adjusted (i.e., in order to save approximately the above-mentioned 5000-30000 container production observation time) and thus also the total time required to adjust the container inspection apparatus as well as the time required for the adjuster or operator to remain at the location of the container inspection apparatus can be reduced as much as possible. The aim of the adjustment of the container inspection apparatus is to achieve the finest possible adjustment of the container inspection apparatus, in which an increase in the detection accuracy of the inspection apparatus is achieved with the greatest possible improvement in the false rejection rate and in compliance with the specifications for the false rejection rate.

In accordance with the invention, the object is achieved by the subject matters of the independent claims and the subject matters described below. Advantageous embodiments and further embodiments of the invention are the subject matter of the sub-claims.

In a method according to the invention for performing a setting operation of a container inspection apparatus, containers to be inspected are transported in the container inspection apparatus in a working operation as a container stream along a predetermined transport path through a transport device. In the container inspection apparatus, at least one sensor device records spatially resolved sensor data in relation to the containers to be inspected, in particular optically. A real-time evaluation device evaluates the spatially resolved sensor data of the individual inspected containers in real time (in the working mode) using an adjustable set of real-time evaluation parameters.

Preferably, the set of real-time evaluation parameters can be changed or adjusted by an operator input (for example by an operator or a configurator, approximately via a human-machine interface device). A change in the set of real-time evaluation parameters set on the real-time evaluation device preferably causes a change in the evaluation of the spatially resolved sensor data.

The method according to the invention comprises storing a plurality of the spatially resolved sensor data acquired by the sensor device on a non-volatile storage device during the working operation for the setting operation. The stored plurality of spatially resolved sensor data is therefore in particular useful for subsequent adjustment operation. The plurality of spatially resolved sensor data stored on the non-volatile storage device is preferably a predetermined selection of the recorded spatially resolved sensor data. The spatially resolved sensor data of this plurality of spatially resolved sensor data is transmitted, in particular in real time, preferably after it has been recorded, initially to a volatile storage device and from there (in particular depending on the container type) to the non-volatile storage device and stored there.

The plurality of the recorded spatially resolved sensor data is retrieved from a setting device (from the non-volatile storage device) in the setting mode. The setting device retrieves the plurality of spatially resolved sensor data substantially simultaneously from the non-volatile storage device. The setting device preferably comprises a human-machine interface device via which the setting process can be controlled by an operator or a configurator. In particular, the setting device serves to optimize the inspection performance of the container inspection apparatus so that the detection accuracy of the container inspection apparatus can be increased as far as possible and, at the same time, approximately a predetermined false defect rate, in particular a predetermined false rejection rate, is not exceeded. The false rejection rate (see above) is usually selected as the false defect rate. The false defect rate, in particular a false rejection rate, is a rate of inspected containers that are classified as defective (or unacceptable) by the container inspection apparatus. In other words, these are those containers that should not be classified as defective, but are nevertheless classified as defective as a result of a setting of the set of real-time evaluation parameters and, in particular (in the case where the false defect rate is the false rejection rate), are rejected from the container flow.

The method further comprises providing that a set of test evaluation parameters is provided to the setting device, which set of test evaluation parameters is to be evaluated with respect to a working operation of the container inspection apparatus. In particular, the evaluation is to be carried out with regard to a working operation of the container inspection apparatus in which the set of test evaluation parameters is set in the real-time evaluation device (as a set of real-time evaluation parameters). In other words, the provided set of test evaluation parameters should be evaluated for its use in the real-time evaluation device (instead of the currently configured set of real-time evaluation parameters). The set of test evaluation parameters can be provided via operator input using the human-machine interface of the setting device.

In particular, an operator can thus specify a set of test evaluation parameters to be evaluated, approximately via the human-machine interface device. For example, the operator can enter values or changes to values for all test evaluation parameters. It is also possible that only exactly one or only individual values and not every value of a set of test evaluation parameters already available to the setting device are changed or set.

The set of test evaluation parameters is in particular different from the set of real-time evaluation parameters (currently) set in the real-time evaluation device.

The set of test evaluation parameters provided should preferably be evaluated to determine whether it leads to a further increase in the detection accuracy of the inspection apparatus, in particular while at the same time the false rejection rate, i.e., the rate of incorrect assessments of a container as defective, can be further reduced or at least a predetermined maximum false rejection rate is not exceeded.

The method according to the invention further comprises that the setting device for evaluating the set of test evaluation parameters determines at least one statistical evaluation variable based on the retrieved plurality of spatially resolved sensor data (in a computer-implemented method step).

The statistical evaluation variable is in particular a statistical variable that is determined based on the retrieved plurality of spatially resolved sensor data and thus based on sensor data relating to a plurality of containers. In other words, not only the spatially resolved sensor data corresponding to a single container is used to evaluate the (new) set of test evaluation parameters, but a statistical evaluation variable is determined in relation to the corresponding sensor data of a plurality of containers.

It is thus proposed that, in order to evaluate the new set of test evaluation parameters to be evaluated, a statistical evaluation variable is determined independently of the working operation of the container inspection apparatus by a plurality of already existing spatially resolved sensor data. For this purpose, a plurality of recorded spatially resolved sensor data is stored on the non-volatile storage device while the container inspection apparatus is still in a working mode in which the "current" or a set of real-time evaluation parameters that still needs to be fine-tuned is set.

This offers the advantage that a statistical evaluation variable can be determined without having to test the set of test evaluation parameters to be evaluated in a working operation of the container inspection apparatus by transferring them to the real-time evaluation device in order to obtain this statistical evaluation variable. In this case, if the set of test evaluation parameters to be evaluated turns out not to be suitable for practical use, the proposed method can advantageously prevent such a set of test evaluation parameters that is not suitable for practical use from being set and used as a set of real-time evaluation parameters in the working operation of the container inspection apparatus. In view of the extremely high production speeds, it is advantageous to prevent a large plurality of containers from being incorrectly inspected in a very short time, for example by incorrectly classifying them as defective, when implementing such an operation with a set of test evaluation parameters that are not suitable for such a practical use. This saves a great deal of material resources, reduces set-up times and prevents unintentional production downtime.

In other words, before the set of test evaluation parameters to be evaluated is taken over and transferred to the real-time evaluation device, it is proposed to test this set of test evaluation parameters not only on the basis of individual spatially resolved sensor data, but to evaluate it on the basis of a plurality of spatially resolved sensor data (substantially already available at the time the set of test evaluation parameters is provided).

A statistical (evaluation) variable is in particular a variable that is determined on the basis of spatially resolved sensor data (stored on the non-volatile storage device) in relation to a plurality of containers. In particular, the plurality of containers preferably means at least 50, preferably at least 100, preferably at least 1000, preferably at least (in particular more than) 5000, preferably at least 10,000 and particularly preferably at least 30,000 containers (spatially resolved sensor data). In particular, the plurality of containers used to determine the statistical (evaluation) variable are containers of the same container type, i.e., preferably containers that have each been treated with the same treatment steps.

The determined statistical (evaluation) variable is preferably a statistically significant result. It is also conceivable that the setting device validates whether the statistical evaluation variable is a statistically significant result. It is also conceivable that the setting device determines and/or outputs and/or makes available for output a variable characteristic of the validity and/or significance of the statistical evaluation variable.

In a preferred method, the setting device determines the statistical evaluation variable independently of the set of real-time evaluation parameters (currently) set in the real-time evaluation device. This offers the advantage of a production-free setting mode in which, in particular, a statistical evaluation can already be made without the set of test evaluation parameters to be evaluated having to be armed in the real-time evaluation device and containers having to be checked by means of the configured set of test evaluation parameters during working operation.

The set of test evaluation parameters is preferably transmitted to the real-time evaluation device and/or set and used by the real-time evaluation device as a set of real-time evaluation parameters only after the statistical evaluation variable has been determined.

The set of test evaluation parameters to be evaluated must preferably be first released before it can be transferred to the real-time evaluation device as a (new) set of real-time evaluation parameters. The set of test evaluation parameters to be evaluated can preferably only be released by an operator or a configurator after the statistical evaluation variable has been determined.

The statistical evaluation variable is preferably determined before an operator releases the set of test evaluation parameters to adjust the set of real-time evaluation parameters.

In a preferred method, the at least one statistical evaluation variable is determined based on the set of test evaluation parameters while simultaneously inspecting containers in the running working mode based on the (originally set) set of real-time evaluation parameters. This offers the advantage that during the setting mode and in any case up to the determination of the statistical evaluation variable, a simultaneously running working mode with the (currently) configured set of real-time evaluation parameters can be continued uninterruptedly (at unchanged production speed).

The setting mode and the working mode are preferably decoupled from one another in terms of time. The setting mode and the working mode can preferably be decoupled from one another in terms of time. Due to the temporal decoupling of manufacturing and setting of the machine, the adjuster can also configure a container type that was produced two weeks ago, for example, because the images (or the spatially resolved sensor data) are stored, in particular on the non-volatile storage device.

In particular, the period of the working operation in which the plurality of spatially resolved sensor data (of the inspected containers) is recorded by the sensor device, in particular, and stored on the non-volatile storage device, is decoupled in time from the setting operation (which is performed on the basis of this stored plurality of spatially resolved sensor data) or can be decoupled in time.

Such a temporal decoupling in particular means that the period of working mode relevant for recording and storing the plurality of spatially resolved sensor data does not have to be performed immediately before or at a fixed distance from the start of the setting mode or even during the setting mode, but can be performed in a temporally variable manner before the setting mode (with respect to the start of the setting mode)—at least partially and preferably completely. Conversely, this offers the advantage for the adjuster that he can choose the time of implementing the setting mode in a very flexible manner, since the time of implementing the setting mode is not dependent on (simultaneous) manufacturing and/or inspection and/or detection of the containers in relation to the container type to be set.

The setting mode can preferably be performed and/or is performed with respect to a first container type, while at the same time the working mode of the container inspection apparatus is performed with respect to a second container type different from the first (if a plurality of the spatially resolved sensor data recorded by the sensor device with respect to the first container type has already been stored on the non-volatile storage device in a temporally preceding working mode of the container inspection apparatus).

In a preferred method, an inspected container is discharged from a rejection device in the working mode depending on the evaluation carried out by the real-time evaluation device. Rejection is in particular understood to mean an (at least temporary and preferably final) removal from the container flow.

The container inspection apparatus preferably determines a rejection variable for each inspected container, which is in particular characteristic of whether the inspected container is to be rejected (by the rejection device) or not. The rejection variable is preferably determined depending on the evaluation of the spatially resolved sensor data recorded in relation to the respective inspected container. The rejection variable could, for example, be a binary variable (e.g., characteristic for rejection/non-rejection).

The statistical evaluation variable is preferably characteristic for a statistical rejection variable of the rejection device and preferably for a prediction of the statistical rejection variable of the rejection device in a working mode of the container inspection apparatus. By "characteristic of a statistical rejection variable of the rejection device" it is to be understood in particular that the "statistical evaluation variable" determined (by the setting device) has a certain informative value in relation to the statistical rejection variable of the rejection device (and this although the setting device evaluates and processes the retrieved sensor data purely "notionally" or exclusively in computer-implemented method steps and in particular although the setting device does not exchange data with the rejection device). This is intended to enable the operator, approximately, to derive a variable from the statistical evaluation variable which he can compare directly or indirectly with a statistical rejection variable determined in the working mode of the inspection apparatus (using containers actually rejected and/or not rejected in the working mode).

In other words, the setting device thus simulates the working mode of the real-time evaluation device and the rejection device, and predicts a statistical rejection variable of the rejection device for an operation of the real-time evaluation device in which the set of test evaluation parameters (then adopted or set as the set of real-time evaluation parameters and) is used to evaluate the spatially resolved sensor data by determining the statistical evaluation variable.

The statistical rejection variable is in particular a statistical variable as described above according to a preferred embodiment.

The statistical rejection variable of the rejection device is preferably a relative variable (approximately based on a totality of containers) and/or a rejection rate (based on a time period) and/or a percentage part of the containers to be rejected and/or rejected out of the total number of containers entering the container inspection apparatus (and/or containers detected by exactly one sensor device) or a variable characteristic thereof. The statistical rejection rate is preferably the total rejection rate or a variable characteristic therefore.

The statistical rejection variable is preferably determined and/or recorded during working mode of the container inspection apparatus (by the rejection device and/or by the container inspection apparatus and/or by the real-time device). This offers the advantage that the prediction of the statistical rejection variable by the setting device can be compared with the (actually) determined statistical rejection variable.

As mentioned above, the determination of the statistical evaluation variable by the setting device advantageously serves to predict a statistical rejection variable of the rejection device in a working mode of the container inspection apparatus with a configured set of test evaluation parameters. In contrast to a "real" statistical rejection variable of the rejection device determined in the working mode, this statistical evaluation variable is determined outside the working mode and (merely) on the basis of a selection of recorded spatially resolved sensor data, namely substantially on the basis of the plurality of spatially resolved sensor data stored on the non-volatile storage device. In contrast to this, every container inspected (within a given period of time) is taken into account in the statistical rejection rate determined in the working mode. In extensive experiments, the applicant has found that the behavior of the statistical rejection variable, approximately the total rejection rate, is a very good indicator for the evaluation of a new set of test evaluation parameters, in particular for the evaluation of a false rejection rate.

A person skilled in the art can assess with a high degree of accuracy (although not 100%) whether a container judged to be faulty by the real-time evaluation parameters is actually faulty or should be rated as good by examining the stored camera images.

A statistical rejection variable preferably determined and/ or recorded in a working mode is transmitted to the setting device and/or provided (in particular together with the statistical evaluation variable) to an output device for output or visualization to an operator or configurator. Advantageously, this allows a comparison to be made (for example by the operator or the configurator) between the statistical evaluation variable determined by the setting device for predicting the statistical rejection variable and a corresponding "real" statistical rejection variable determined in the working mode.

For example, if no (significant) increase in the overall rejection rate of the system in question is shown when a set of real-time evaluation parameters is changed, it can be assumed in particular that with increased inspection accuracy (brought about by the change, improvement or optimization to the produced container type of the set of real-time evaluation parameters), the false rejection has remained almost the same (with respect to the previously adjusted set of test evaluation parameters), which is in particular the intended goal. A reduction in the statistical evaluation parameter can also be an indicator that the false rejection rate decreases while the inspection accuracy remains the same. The advantage of this is that it allows indirect conclusions to be drawn about the effect of a change in the setting of the set of real-time evaluation parameters on the false rejection rate, which per se cannot be determined 100% on the basis of camera images.

In a preferred method, the statistical evaluation variable is determined separately from the container inspection apparatus.

In a preferred method, criteria for storing spatially resolved sensor data on the non-volatile storage device can be predefined (by a user). In particular, a storage period can be specified within which the spatially resolved sensor data must be stored. Alternatively or additionally, a container type can be specified for which spatially resolved sensor data are to be stored on the non-volatile storage device. Alternatively or additionally, a container number can be specified for which spatially resolved sensor data are to be stored on the non-volatile storage device.

In this manner, an intended setting mode can be prepared by using the already running working mode (in advance of the setting mode) to collect a plurality of spatially resolved sensor data in relation to the desired container type (in relation to which the container inspection apparatus is to be adjusted) for the evaluation of a set of test evaluation parameters. The plurality of spatially resolved sensor data stored on the non-volatile storage device can preferably be retrieved by the setting device at a predeterminable retrieval time (in particular by user input). The retrieval time is preferably separated in time from the storage time. The advantage of this is that an operator or configurator can choose for himself when he wants to carry out the setting mode or an evaluation of the set of test evaluation parameters, since the plurality of spatially resolved sensor data required for this has already been determined in an earlier period and is available for retrieval for the setting mode on the non-volatile storage device.

In particular after the basic settings of camera, optics and lamp has been made, saved (camera) images allow offline adjustment of image processing in any type that has been produced at some point. Setting work and manufacturing are thus advantageously decoupled in terms of time.

The configurator does not have to wait for a particular type to be produced again. Even when he is not on the construction site, the sensor data—such as camera images—are stored and is available for his next job. It can also adjust or optimize image processing on days that are scheduled for line maintenance.

This offers the advantage that slow, faltering or missing manufacturing no longer prevents the adjuster from configuring a type. The effect of a parameter change can be quickly assessed even with slow manufacturing. Production interruptions no longer affect the setting work on the inspection machine's image processing.

Employees of a teleservice, such as those of the manufacturer of the container inspection apparatus and/or its service provider, can also advantageously use the function and thereby saving time. In particular for online commissioning and RCC commissioning (RCC=Remote Control Center). Camera images document the production process over time, for example changes to the production material or material quality.

The rejection rate or a statistical rejection variable of the rejection device for the existing image data set or for the spatially resolved sensor data stored and/or retrieved on the non-volatile storage device is preferably determined without manufacturing, i.e., in particular without the container inspection apparatus being executed in working mode.

In a preferred method, the set of real-time evaluation parameters currently set in the real-time evaluation device is transmitted to the setting device. The setting device preferably determines a statistical evaluation parameter based on this, so that the currently set real-time evaluation parameter set can be compared and/or is compared with a different set of test evaluation parameters. This offers the advantage that the statistical evaluation parameter can be determined for the set of real-time evaluation parameters and for the set of test evaluation parameters for substantially the same plurality of spatially resolved sensor data. In this manner, a comparison with a (real) statistical rejection variable determined in a working mode, such as the rejection rate, can be used to check and/or check the plausibility of whether the statistical evaluation variable determined by the determination device is sufficiently meaningful. In other words, it can be checked whether the setting device has a sufficiently large data set of spatially resolved sensor data available to determine the statistical evaluation variable. Furthermore, a direct comparison can be made between the set of real-time evaluation parameters currently set in the real-time evaluation device and the set of test evaluation parameters to be evaluated.

In a preferred method, the setting device repeatedly determines statistical evaluation variables, wherein further spatially resolved sensor data and/or changes to at least one test evaluation parameter are taken into account. This offers the advantage that, if the working mode is running in parallel to the setting mode, spatially resolved sensor data currently recorded in the working mode can be taken into account when determining the statistical evaluation variable. Preferably, the setting device repeatedly determines the statistical evaluation variables in the time cycle of the working mode of the container inspection apparatus running parallel to the setting mode.

A change of at least one test evaluation parameter (approximately by means of operator input) preferably triggers a determination of the statistical evaluation variable.

In a preferred method, a second set of test evaluation parameters to be evaluated is provided to the setting device and, depending on this second set of test evaluation parameters, a second statistical evaluation variable is determined based on the retrieved plurality of spatially resolved sensor data. The first statistical evaluation variable and the second statistical evaluation variable are preferably determined based on the same plurality of spatially resolved sensor data.

A first set of image evaluation parameters (or test evaluation parameters) is preferably parametrized, in particular parallel to the production process (or working mode), in order to achieve a desired detection accuracy, in particular specified and/or guaranteed by an operator and/or a manufacturer of the container inspection apparatus.

The first set of (offline) image evaluation parameters (or test evaluation parameters) is preferably used to evaluate the plurality of the spatially resolved sensor data (in particular (camera) images) stored on the non-volatile storage apparatus and, in particular, a first rejection rate (or a first statistical evaluation variable) is determined.

If it stands that the rejection rate, in particular the false rejection rate, is not suitable for practical use (approximately too high), the image evaluation parameters (or test evaluation parameters) are preferably re-parameterized, wherein—preferably during the parameterization—a rejection rate (or a statistical evaluation variable) is already calculated on the basis of the parameter changes. The term "during" is in particular understood to mean that a parameter change of just one increment triggers the quota calculation and/or that the configurator or operator requests a quota calculation, e.g., after parameterization has been completed.

If a low rejection rate, in particular the false rejection rate, allows a further increase in detection accuracy, the image evaluation parameters (or test evaluation parameters) are preferably parameterized, wherein—preferably during parameterization—a rejection rate is already calculated on the basis of the parameter changes. The term "during" is in particular understood also here to mean that a parameter change of one increment triggers the quota calculation and/or that the configurator or operator requests a quota calculation, e.g., after parameterization has been completed.

The setting device preferably determines at least one statistical evaluation parameter for each new set of test evaluation parameters to be evaluated.

In a preferred method, the setting device exchanges data with the real-time evaluation device and/or the at least one sensor device (and/or the container inspection apparatus) via a wireless communication connection, and preferably at least in portions via a public network (such as the Internet). The set of test evaluation parameters and/or the plurality of spatially resolved sensor data and/or the set of real-time evaluation parameters are preferably transmitted via the wireless communication connection and/or the public network.

The real-time evaluation device preferably determines at least one container state variable, approximately a contamination variable, in relation to the inspected container, wherein the container state variable is, for example, characteristic of contamination of the container.

A container state variable in relation to the inspected container is in particular understood as a variable in relation to the inspected container which is characteristic of a quality state and/or a contamination state and/or a defect state and/or a fault state of the inspected container (and thus for a current container state at the time of inspection or detection by the sensor device). For example, the container state variable can be a contamination variable and/or a defect variable and/or a malfunction of the container. Preferably, it can be derived from the container state variable in relation to the inspected container whether the container should be rejected.

In particular, the term "container state" of a container is understood to mean a quality state and/or a contamination state and/or defect state and/or fault state. In general, the term "container state" can be understood as a state of the container in which the container has a certain and/or predetermined (in particular undesirable) property or a (in particular undesirable) feature, due to the presence of which (in particular by the operator of the container inspection apparatus and/or a container treatment system) it is intended to perform a particular treatment step on the container, and which is therefore to be identified by the container inspection apparatus (with the highest possible detection accuracy). One possible treatment step could, for example, be to reject the container from the container flow.

A plurality of (mutually different) classes of container states (in particular defect states and/or fault states) can preferably be specified. For example, different classes of container states may refer to the respective container state of different areas of the container, which are selected, for example, from a group comprising a bottom area, an outer wall area, a side wall area, a corrugation in the bottom area, a support ring area, a mouth area and similar, and combinations thereof.

The different classes can differ depending on the inspection tasks of the respective sensor unit or sensor device. The method can be used for container bottom, sealing surface, side wall, thread, closure, fill level, label, originality, suspended matter and residual liquid inspections.

Additionally or alternatively, a class of container states may also refer to (exactly or at least) one of (one another) different defect types (such as crack, tear, fracture, etc.) and/or defect types, which may be selected from a group comprising defects, fractures, cracks, different crack types, (glass) fragments, chipping, soiling, soiling types, material distributions in relation to a defect and the like, and combinations thereof.

The real-time evaluation device preferably provides (in particular in real time) the container state variable of the rejection device for rejection or ejection of the inspected container (from the container stream) as a function of the at least one container state variable.

It is conceivable that the rejection device determines the rejection variable (in particular exclusively) on the basis of the container status variable (provided and/or transmitted by the real-time evaluation device). It is also conceivable that the rejection variable is already provided and/or transmitted to the rejection device (approximately in the form of the variable derived from the container state variable).

The setting device preferably evaluates the retrieved plurality of spatially resolved sensor data individually for individual containers using the set of test evaluation parameters by determining at least one container state variable for each container.

Preferably, a set of test evaluation parameters is provided which takes into account an additional class of a container state compared to the configured set of real-time evaluation parameters. For example, the set of test evaluation parameters can parameterize an additional defect type (compared to the set of real-time evaluation parameters).

In a preferred method, the real-time evaluation parameters and/or the test evaluation parameters are selected from a group comprising a variable characteristic of at least one ROI, a variable characteristic of a sensor setting, a variable characteristic of an evaluation accuracy, a variable characteristic of at least one class of a container state, and similar.

The set of real-time evaluation parameters and/or set of test evaluation parameters is preferably a sort-specific set of evaluation parameters, i.e., for exactly one container type and/or production type. The present invention is only described in relation to one container type and/or production type in each case. It is understood (and should be understood herein) that the container inspection apparatus may have a set of real-time evaluation parameters set for a plurality of container types and/or production types, and a set of test evaluation parameters may be provided to the setting device, for which all features described in relation to the one set of real-time evaluation parameters or set of test evaluation parameters, individually or in combination together, are also to be regarded as disclosed.

Preferably, the container flow is an (in particular continuous) flow (on the transport path) of successive or consecutive containers. The container flow can be guided or transported in a single lane or in multiple lanes (by the transport device) in certain areas and preferably within the totality of the container inspection apparatus (as a mass flow). At least one sensor device is preferably assigned to each lane of the container flow and detects each container of the container flow located on this lane.

The working mode is preferably a running (production) mode of the container inspection apparatus and/or a running (production) mode of a container treatment plant, such as a container filling plant, which has the container inspection apparatus. In particular, the working mode may be a production mode. In particular, the working mode is not a test mode with a transport speed of the containers (as they pass through the container inspection apparatus) that is approximately lower than a transport speed in a working mode.

The setting device preferably retrieves and/or processes the spatially resolved sensor data stored on the non-volatile storage device for the setting operation substantially simultaneously. Thus, in particular, a statistical rejection variable of the rejection device is not determined by determining rejection variables of containers one after the other and at different times on the basis of sensor data of these containers retrieved one after the other, but the predetermined plurality of recorded spatially resolved sensor data can be retrieved substantially simultaneously and is retrieved substantially together for evaluation and for determining the statistical forecast rejection variable and processed for this purpose.

The present invention is further directed to a container inspection apparatus for inspecting containers with at least one transport device for transporting containers to be inspected as a container stream along a predetermined transport path in a working mode. The container inspection apparatus has at least one sensor device for recording, in particular optically, spatially resolved sensor data in relation to a container to be inspected in the container stream during working mode.

Furthermore, the container inspection apparatus has a real-time evaluation device, in particular a processor-based, which is suitable and intended for evaluating the spatially resolved sensor data of the individual inspected containers in the working mode in real time using an adjustable set of real-time evaluation parameters.

Furthermore, a non-volatile storage device is provided on which a plurality of the spatially resolved sensor data recorded by the sensor device can be stored during working mode. In a setting mode of the container inspection apparatus, the plurality of stored spatially resolved sensor data can be retrieved by a setting device. A set of test evaluation parameters can be made available to the setting device for evaluation, in particular with regard to use as a set of real-time evaluation parameters in the real-time evaluation device. Based on the set of real-time evaluation parameters (which can preferably be transmitted to the setting device), individual (or all) parameters can be changed, which (together with the unchanged parameters, if applicable) form the set of test evaluation parameters.

According to the invention, the setting device for evaluating the set of test evaluation parameters is suitable and intended for determining a statistical evaluation variable on the basis of the retrieved plurality of spatially resolved sensor data.

The container inspection apparatus is preferably configured, suitable and/or intended to carry out the method described above as well as all the method steps already described above in connection with the method, either individually or in combination with one another. Conversely, the method can be equipped with all the features described in relation to the container inspection apparatus and/or setting device, either individually or in combination with one another, and use these to perform the method.

The container inspection apparatus is preferably an empty bottle inspection machine. This can include bottom, mouth, sidewall, thread and/or contour detection. The container inspection apparatus can also be a full bottle inspection machine, preferably with detection of suspended matter and/or foreign matter lying on the container bottom and/or with optical fill level detection.

In an advantageous embodiment, the setting device is arranged at least partially locally separated with respect to the real-time evaluation device and/or the sensor device. The setting device is preferably arranged completely separate from the real-time evaluation device. The setting device is preferably arranged outside the housing of the real-time evaluation device and particularly preferably outside a hall in which the container inspection apparatus or in which the real-time evaluation device is arranged. This offers the advantage that the operator or the adjuster of the container inspection apparatus does not have to be present at the location of the container inspection apparatus to adjust or fine-tune it, but can configure the container inspection apparatus and in particular the real-time evaluation device locally separately via remote maintenance and/or via remote communication access.

It is conceivable that the setting device is not arranged in a stationary position, but is mobile in relation to the container inspection apparatus. It is also conceivable that several setting devices can be present and/or configured at the same time, at least temporarily. For example, it is conceivable that an operator of the treatment device (approximately directly at the location of the real-time evaluation device) and at the same time an (external) operator or configurator each test (independently of each other) an effect (in each case in different ways) of changed real-time evaluation parameters by a setting device.

A wireless communication connection, in particular encrypted, is preferably provided between the real-time evaluation device and/or the setting device for exchanging data relating to the real-time evaluation parameters and/or test evaluation parameters. Data can be exchanged at least in part via a public network, such as the Internet. The advantage of wireless communication (at least in portions) is that it makes it easier to separate the real-time evaluation device and the setting device.

In a further advantageous embodiment, the container inspection apparatus has a rejection device and is suitable and intended for rejecting an inspected container depending on the evaluation carried out by the real-time evaluation device. The statistical evaluation variable is characteristic for a statistical rejection variable of the rejection device, in particular for a forecast of the statistical rejection variable of the rejection device.

The container inspection apparatus preferably comprises the rejection device and/or preferably the rejection device is part of the container inspection apparatus. It is also conceivable that the rejection device is part of the same (container treatment) system as the container inspection apparatus, but is not part of the container inspection apparatus. For example, the container inspection apparatus could be a first structural unit and the rejection device could be a separate or second structural unit, in particular different from the first container inspection apparatus. A container status variable determined by the container inspection device or a variable derived therefrom can preferably (even then) be transmitted and/or made available to the rejection device (via a communication link). The rejection device is preferably arranged downstream of the (at least one) sensor device in the transport direction of the containers.

In a further advantageous embodiment, the transport device transports the containers from a first treatment device to a second treatment device, in particular in the working mode. The first and/or the second treatment device is preferably selected from a group comprising a cleaning apparatus for cleaning the containers, a filling apparatus for filling the containers, a forming apparatus for forming a plastic preform into a plastic container, in particular a blow molding machine, a labeling apparatus and similar, and combinations thereof. The transport device preferably transports the inspected containers from the sensor device to the rejection device.

The setting device is preferably suitable and intended for providing the at least one statistical evaluation variable to an output device, preferably a display device such as a display, for output to an operator.

The sensor device is preferably selected from a group comprising an image recording device, such as a camera, a CMOS sensor (CMOS abbreviation for complementary metal-oxide-semiconductor), a CCD sensor, a 3D sensor, an X-ray-based image recording device, an optical element, a thermal imaging camera and similar, and combinations thereof.

The non-volatile storage device is preferably a fixed storage. Spatially resolved sensor data of at least 50, preferably at least 100, preferably at least 1,000, preferably at least 5,000, preferably at least 10,000, preferably at least 30,000 containers are stored (in particular in the setting mode) in the non-volatile storage device (by the sensor device). All of this sensor data were preferably recorded by the at least one sensor device (or by the several sensor devices) and particularly preferably stored (in real time) on the volatile storage device of the container inspection apparatus (which may be a ring buffer, for example).

The non-volatile storage device is preferably an external storage device, in particular a cloud-based storage device and/or an external server (including storage device), wherein the storage device is accessed in particular via the Internet (and/or via a public and/or private network, in particular at least in sections wired and/or wireless). An external server is in particular an external server, in particular a backend server, in relation to a container inspection apparatus and/or real-time evaluation device and/or setting device.

The external server is, for example, a backend, in particular of a container inspection apparatus manufacturer or a service provider, which is configured to manage spatially resolved sensor data (in particular of a plurality of sensor devices and/or a plurality of container inspection apparatus) and/or to set container inspection apparatus. The functions of the backend or the external server can be carried out in (external) server farms. The (external) server can be a distributed system.

The present invention is further directed to a setting device for performing a setting mode of a container inspection apparatus for inspecting containers. The container inspection apparatus has at least one transport device for transporting containers to be inspected as a container stream along a predetermined transport path in a working mode. Furthermore, the container inspection apparatus has at least one sensor device for recording, in particular optically, spatially resolved sensor data in relation to a container to be inspected in the container stream during working mode. Furthermore, the container inspection apparatus has a real-time evaluation device which is suitable and intended for evaluating the spatially resolved sensor data of the individual inspected containers in real time during working mode using an adjustable set of real-time evaluation parameters.

The container inspection apparatus is furthermore suitable and intended for storing a plurality of the spatially resolved sensor data recorded by the sensor device on a non-volatile storage device during working mode.

The setting device is suitable and intended to retrieve the plurality of stored spatially resolved sensor data in a setting mode. Furthermore, a set of test evaluation parameters can be provided to the setting device for evaluation with respect to an use as a set of real-time evaluation parameters in the real-time evaluation device.

According to the invention, the setting device for evaluating the set of test evaluation parameters is suitable and intended for determining a statistical evaluation variable on the basis of the retrieved plurality of spatially resolved sensor data.

The container inspection apparatus and/or the setting device can be equipped with all the features described above in connection with the container inspection apparatus, either individually or in combination with one another, and vice versa.

The present invention of the container inspection apparatus and the method for performing a setting mode have been described in particular in connection with a rejection device and a rejection variable as well as a statistical rejection variable. However, the present invention can also be applied in general to container inspection apparatus with at least one treatment device, which treats the inspected containers as a function of the evaluation carried out by the real-time evaluation device. Here, a statistical variable can be used as a statistical evaluation variable, in particular instead of the statistical rejection variable, which is characteristic of the treating of an inspected container (or an intermediate result) carried out and/or to be performed by the treatment device depending on the evaluation (for example, depending on an inspection result). The applicant reserves the right to also claim a method and a container inspection apparatus directed thereto.

The present invention of the container inspection apparatus and the method for setting a container inspection apparatus have each been described in connection with a container to be inspected. However, the present invention can also be generally applied to inspection apparatus for inspecting unit loads. The applicant reserves the right to also claim a method and a container inspection apparatus directed thereto.

The present invention is further directed to a system comprising a container inspection apparatus in accordance with one of the embodiments described above and a setting device in accordance with one of the embodiments described above.

The present invention is further directed to a computer program or computer program product comprising program means, in particular a program code, which represents or encodes at least individual method steps of the method according to the invention, in particular the method steps carried out by the setting device (in particular with regard to the computer-implemented processing of the predetermined plurality of spatially resolved sensor data and the determination of the statistical predicted variable), and preferably one of the preferred embodiments described, and is designed to be executed by a processor device.

The present invention is further directed to a data storage on which at least one embodiment of the computer program according to the invention or a preferred embodiment of the computer program is stored.

The present invention is further directed to a container inspection apparatus for inspecting containers with at least one transport device for transporting containers to be inspected as a container stream along a predetermined transport path, with at least one sensor device for detecting, in particular optically, spatially resolved sensor data in relation to a container of the container stream to be inspected, and with a real-time evaluation device for determining at least one container state variable in relation to the inspected container on the basis of the recorded spatially resolved sensor data of the inspected container and on the basis of a predetermined set of real-time evaluation parameters which can be changed particularly by means of an operator input, wherein the real-time evaluation device is suitable and intended for providing the container state variable or a variable derived therefrom to a rejection device for rejection of the inspected container as a function of the at least one container state variable.

According to the invention, a simulation evaluation device (referred to above as setting device) is provided for simulating the real-time evaluation device, which is suitable and intended for determining at least one statistical forecast rejection variable for forecasting a statistical rejection variable of the rejection device in a working mode of the container inspection apparatus, and which is suitable and intended for retrieving a predetermined plurality of recorded spatially resolved sensor data of inspected containers, in particular stored on a non-volatile storage device, and determining the at least one statistical forecast rejection variable on the basis of this plurality of sensor data and on the basis of a set of simulation evaluation parameters which can be determined, in particular, as a function of an operator input based on at least one operator input. In particular, the simulation takes place in a setting mode as described above.

In a preferred embodiment, the simulation evaluation device is suitable and intended to determine at least one simulation container state variable (in a computer-implemented method step) for the sensor data in relation to each inspected container of the retrieved plurality of recorded spatially resolved sensor data on the basis of the set of simulation evaluation parameters, wherein preferably the statistical forecast rejection variable is determined on the basis of the simulation container state variables determined for the plurality of recorded spatially resolved sensor data. The statistical forecast rejection variable is preferably determined on the basis of the simulation container state variables determined for the plurality of spatially resolved sensor data recorded.

In a preferred embodiment, the simulation evaluation device is configured, suitable and intended to determine a variable characteristic of and in particular substantially identical to the container state variable, in such a manner that it substantially corresponds to the predetermined set of real-time evaluation parameters, in the case of predetermined acquired spatially resolved sensor data, in particular as a simulation container state variable.

In a preferred embodiment, the simulation evaluation device is suitable and intended to provide the at least one statistical forecast rejection variable to an output device for output to an operator.

In a preferred embodiment, the simulation evaluation device is suitable and intended to take into account a change in at least one real-time evaluation parameter and/or at least one parameter for recording the sensor data when determining the statistical forecast rejection variable.

In a preferred embodiment, the evaluation parameters and/or the simulation evaluation parameters are selected from a group comprising a variable characteristic of at least one ROI, a variable characteristic of a sensor setting, a variable characteristic of an evaluation accuracy, a variable characteristic of at least one class of a container state, and similar.

In a preferred embodiment, the simulation evaluation device is arranged at least partially locally separated with respect to the container inspection apparatus and/or the sensor device.

In a preferred embodiment, the container inspection apparatus and the simulation evaluation device are suitable, intended and configured in such a manner that the plurality of sensor data to be taken into account for determining the statistical forecast rejection variable can be retrieved by the simulation evaluation device at a later point in time, in particular by user input, with respect to their recording period and/or their storage period on the non-volatile storage device.

In a preferred embodiment, a comparison device is provided which compares a determined statistical rejection variable of the rejection device with the determined predicted rejection variable. In a preferred embodiment, the simulation evaluation device is suitable and intended to retrieve the predetermined set of evaluation parameters.

In a preferred embodiment, the transport device transports the containers from a first treatment device to a second treatment device and preferably the first and/or the second treatment device is selected from a group comprising a cleaning device for cleaning the containers, a filling device for filling the containers, a forming device for forming a plastic preform into a plastic container, in particular a blow molding machine, a labeling device and similar, and combinations thereof.

The present invention is further directed to a method for the setting, in particular for the fine setting, of a container inspection apparatus with a transport device for transporting containers to be inspected as a container stream along a predetermined transport path, with at least one sensor device for the, in particular optical, recording of spatially resolved sensor data in relation to a container to be inspected of the container stream, and with a real-time evaluation device for determining at least one container state variable in relation to the container to be inspected, with a real-time evaluation device for determining at least one container status variable in relation to the inspected container on the basis of the recorded spatially resolved sensor data of the inspected container and on the basis of a predetermined set of evaluation parameters which can be changed in particular by an operator input, wherein the real-time evaluation device is suitable and intended for providing the container state variable or a variable derived therefrom to a rejection device for rejection of the inspected container as a function of the at least one container state variable.

According to the invention, a simulation evaluation device for simulating the real-time evaluation device determines at least one statistical forecast rejection variable for forecasting a statistical rejection variable of the rejection device in a working mode of the container inspection apparatus.

The simulation evaluation device retrieves a predetermined plurality of recorded spatially resolved sensor data of inspected containers, in particular stored on a non-volatile storage device, and determines the at least one statistical forecast rejection variable on the basis of this plurality of sensor data and on the basis of a set of simulation evaluation parameters, which can be determined in particular as a function of at least one operator input.

In an advantageous embodiment, the plurality of sensor data to be considered for determining the statistical forecast rejection variable is stored on the non-volatile storage device at a first point in time and is retrieved by the simulation evaluation device and/or evaluated for determining the statistical forecast rejection variable at a second point in time which can be predetermined, in particular by user input, and which is later with respect to the first point in time.

In an advantageous embodiment, the simulation evaluation device determines an at least first statistical forecast rejection variable on the basis of a first set of simulation evaluation parameters and determines an at least second statistical forecast rejection variable on the basis of a second set of simulation evaluation parameters and preferably compares the second statistical forecast rejection variable with the first statistical forecast rejection variable.

In an advantageous embodiment, when determining a further set of simulation evaluation parameters, a detection accuracy brought about by at least one simulation evaluation parameter and preferably by the set of simulation evaluation parameters, in particular an increase in the detection accuracy and/or reduction in the false rejection rate, of the inspection device and/or the real-time evaluation device, is taken into account.

Further advantages and embodiments are shown in the attached drawing. In the drawings:

FIG. 1 shows a schematic diagram of a container inspection apparatus according to an embodiment of the invention.

FIG. 1 shows a schematic diagram of a container inspection apparatus 1 according to an embodiment of the invention. The container inspection apparatus 1 has a sensor device 20 for the detection and/or receptacle of spatially resolved sensor data of a container. Furthermore, the container inspection apparatus 1 has a, preferably volatile, (real-time) storage device 22, which is approximately an image storage. (All) Sensor data recorded by the sensor device 20 is stored (at least and preferably exclusively temporarily) on this in particular volatile (real-time) storage device or on this image storage.

The container inspection apparatus shown in FIG. 1 is described here with reference to camera images as spatially resolved sensor data and a camera as sensor device 20.

However, it is clear to a person skilled in art that the aspects described here can be implemented in an analogous manner with other sensor devices and thus other sensor data.

During manufacturing, the inspection machine or the container inspection apparatus 1 or a system for setting a container inspection apparatus stores as many camera images as possible (or more generally spatially resolved sensor data)—preferably in accordance with a storage strategy 44 that can be preset, for example by an operator or by means of an operator input—on an in particular non-volatile storage device 34.

In other words, based on the storage strategy 44 (which is predetermined and in particular can be predetermined by means of operator input at a human-machine interface device 42), an assessment 32 is made and/or an instruction is generated (such as by generating a control signal), in particular by the container inspection apparatus 1 and in particular by a processor device of the container inspection apparatus, in accordance with predetermined criteria for storing the camera image data, whether sensor data (in particular images) recorded by the sensor device 20 and/or stored in the in particular volatile (real-time) storage device 22 are to be stored in a storage device 34 (different from the storage device 22) and/or transmitted to the latter.

According to the storage strategy 44, it is thus determined, for example, whether only the "good" images, for example the camera images that were judged by the real-time evaluation parameters to be containers not to be rejected, only the "bad" images (for example the camera images of the containers to be rejected) or all images (both camera images of containers to be rejected and of containers not to be rejected, i.e., without further preference) 32 are stored in the storage device 34 and/or transmitted to it from the (in particular volatile) storage device 22.

The camera images are preferably stored sorted by production type (in the in particular non-volatile storage device 34).

The in particular non-volatile storage device 34, in particular an image storage, is preferably a fixed storage and/or a storage on which the sensor data can be stored and/or retrieved not only temporarily. The storage device, in particular the non-volatile storage device, preferably has a storage capacity for approximately 100 images (or for spatially resolved sensor data of approximately and preferably more than 100 containers), preferably for more than 1000 images and particularly preferably for more than 10,000 images.

The container inspection apparatus 1 has preferably a real-time evaluation device 24 (for performing a real-time image evaluation). This determines, in particular on the basis of the sensor data (here camera images) recorded by the sensor device 20, which are stored in particular on the volatile storage device 22, in particular as (inspection) result 26, at least one container status variable in relation to the (respective) inspected container. On the basis of the (inspection) result 26 and/or on the basis of the determined container state variable, a rejection variable is preferably determined for each inspected container, which is characteristic of whether it should be rejected (in particular by a rejection device 28) (rejection yes/no).

With respect to the (inspection) results 26 of a plurality (in particular successive) of inspected containers of the container stream, a statistic 30 is preferably generated (approximately by determining a statistical evaluation variable), for example by determining a statistical rejection variable, such as a rejection rate.

According to a preferred embodiment, the camera system (or container inspection apparatus 1) preferably runs a set of real-time evaluation parameters, which are also known as sensitivity parameters, in manufacturing (real-time). These sensitivity parameters represent the real-time evaluation parameters of the container inspection apparatus 1 or the real-time evaluation device 26, approximately. These can be changed and/or adjusted (in particular by an operator input, approximately via an input device 42), in particular individually.

At the same time, ROI, camera parameter and sensitivity changes can be made, preferably in a setting mode of the container inspection apparatus 1, without affecting the real-time part.

A setting device 38 (in particular as part of the container inspection apparatus 1) is preferably provided in which an effect of changes in at least one real-time evaluation parameter can be simulated without influencing the real-time part, in other words without changing the real-time evaluation parameters used in the real-time inspection of the containers of the container stream to be inspected.

In other words, the setting device 38 in particular performs an "offline image evaluation", wherein (in this setting mode) sensitivity settings (or changes to the test evaluation parameters) can be made.

For this purpose, in this preferred embodiment, a set of test evaluation parameters is provided to the setting device 38 (and stored in a storage device of the setting device, for example), for example by transmitting the (individual values of the) set of real-time evaluation parameters (approximately via the communication connection 46) from the real-time evaluation device 24 to the setting device 38. Based on this, the values of the test evaluation parameters can be set according to (or identical to) the (transmitted) set of real-time evaluation parameters (of the real-time evaluation device), in particular automatically.

Changes to the set of test evaluation parameters can preferably be initiated and/or entered by an operator via a human-machine interface device 42. For example, changes can be made to the values of individual and/or several and/or all test evaluation parameters. It is also conceivable that new test evaluation parameters are added (to the set of test evaluation parameters), which are suitable and intended, for example, for the detection or perception of a defect class of a container or class of a container state that has not yet been (or not sufficiently) taken into account. However, it is also conceivable that some test evaluation parameters are omitted such that they are no longer taken into account during a container inspection.

Furthermore, according to the preferred embodiment, a transmission 36 (preferably on request) of the sensor data (here camera images) stored on the, in particular non-volatile, storage device 34 (captured by the sensor device 20, in particular of a plurality of containers) to the setting device 38, in particular for preview statistics calculation and/or for determining a statistical prognosis inspection variable, such as a statistical evaluation variable. For example, a forecast of the rejection rate (by the setting device 38) can be determined as a statistical evaluation variable. This determined statistical data 40, referred to in FIG. 1 as "statistical data preview", for example a determined statistical evaluation variable, can be output to the operator or configurator by the human-machine interface device 42, for example a display device 42, and in particular can be output visually.

Furthermore, also by the human-machine interface device 42, for example a display device 42, the "statistical data manufacturing" marked with reference numerals 48 in FIG. 1, which is a statistical variable from the production mode or working mode of the container inspection apparatus, can be output to the operator or configurator, in particular optically. For example, a (statistical) rejection rate (determined or measured in a working mode) can be transmitted as "statistical manufacturing data" and preferably compared with the statistical evaluation variable (for predicting a rejection variable of the rejection device).

Each time a (test evaluation) parameter of the image processing (in particular in the setting device) is changed, the machine (or the setting device 38) preferably starts to re-inspect the stored camera images with the changed (test evaluation) parameters in a background process. After just a few seconds, it shows the operator how his parameter change would affect the rejection rate (by calculating and/or determining and outputting a statistical evaluation variable based on the images already processed, which is characteristic, for example, of a statistical rejection variable of the rejection device).

The estimation of the rejection rate becomes more accurate the more stored images are re-inspected. The display could therefore initially show a rough estimate, which is preferably updated continuously, while the camera images are preferably inspected further in the background. In particular, a high level of statistical certainty is achieved after just 30 seconds and the displayed value will hardly fluctuate.

If the rejection rate changes as desired, the operator can save the changed parameters and transfer them to the production process. This is characterized by the reference numerals 46, by which a (data) communication connection (from the human-machine interface device 42 (an input and display device, for example) and/or an input device and/or an output device and/or from the setting device 38) for transmitting the sensitivity parameters or the test evaluation parameters (only) by operator input (as new real-time evaluation parameters) to the real-time evaluation device 24 is represented.

If the effect is not as desired, the configurator can check the inspection result on each individual camera image or discard the change.

To ensure that no outdated camera images are saved, the camera images of the current type can be deleted each time a parameter of the camera or lamp changes.

Stored camera images can also be used in the development of new inspection methods (e.g., deep learning methods).

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

LIST OF REFERENCE SIGNS

1 container inspection apparatus
20 sensor device, camera
22 volatile storage device

24 real-time evaluation device
26 result
28 rejection device
30 statistics
32 assessment storage of sensor data
34 storage device
36 transmission for preview statistics calculation
38 setting device
40 statistical data preview
42 input and display device
44 storage strategy
48 manufacturing statistical data

The invention claimed is:

1. A method for performing a setting mode of a container inspection apparatus, in which, in a working mode, a transport device transports containers to be inspected as a container stream along a predetermined transport path and at least one sensor device detects spatially resolved sensor data with respect to the containers to be inspected, in particular optically, and a real-time evaluation device evaluates the spatially resolved sensor data of the individual inspected containers in real time with the aid of an adjustable set of real-time evaluation parameters, comprising:

for the setting mode, a plurality of the spatially resolved sensor data recorded by the sensor device is stored on a non-volatile storage device during the working mode, which is retrieved by a setting device during the setting mode;

the setting device is provided with a set of test evaluation parameters to be evaluated with respect to a working mode of the container inspection apparatus, in which the set of test evaluation parameters is set in the real-time evaluation device as the set of real-time evaluation parameters;

to evaluate the set of test evaluation parameters, the setting device determines at least one statistical evaluation variable on the basis of the retrieved plurality of spatially resolved sensor data.

2. The method according to claim 1, wherein the setting device determines the statistical evaluation variable independently of the set of real-time evaluation variables set in the real-time evaluation device.

3. The method according to claim 2, wherein the at least one statistical evaluation variable is determined based on the set of test evaluation variables while simultaneously inspecting containers based on the set of real-time evaluation variable in the working mode in the container inspection apparatus.

4. The method according to claim 2, wherein in the working mode an inspected container is rejected by a rejection device as a function of the evaluation carried out by the real-time evaluation device, and wherein the statistical evaluation variable is characteristic of a statistical rejection variable of the rejection device.

5. The method according to claim 2, wherein the statistical evaluation variable is determined locally separately from the container inspection apparatus.

6. The method according to claim 1, wherein the at least one statistical evaluation variable is determined based on the set of test evaluation variables while simultaneously inspecting containers based on the set of real-time evaluation variable in the working mode in the container inspection apparatus.

7. The method according to claim 1, wherein in the working mode an inspected container is rejected by a rejection device as a function of the evaluation carried out by the real-time evaluation device, and wherein the statistical evaluation variable is characteristic of a statistical rejection variable of the rejection device.

8. The method according to claim 1, wherein the statistical evaluation variable is determined locally separately from the container inspection apparatus.

9. The method according to claim 1, wherein criteria for storing spatially resolved sensor data on the non-volatile storage device can be preset by a user, in particular a storage period within which the spatially resolved sensor data are to be stored and/or a container type for which spatially resolved sensor data are to be stored and/or a container number for which spatially resolved sensor data are to be stored.

10. The method according to claim 1, wherein the set of real-time evaluation parameters currently set in the real-time evaluation device is transmitted to the setting device and the setting device determines a statistical evaluation variable based thereon, so that the currently configured set of real-time evaluation parameters is comparable with a different set of test evaluation parameters.

11. The method according to claim 1, wherein the setting device repeatedly determines statistical evaluation variables, wherein further spatially resolved sensor data and/or changes to at least one test evaluation parameter are taken into account.

12. The method according to claim 1, wherein a second set of test evaluation parameters to be evaluated is provided to the setting device and a second statistical evaluation variable is determined as a function of this second set of test evaluation parameters on the basis of the retrieved plurality of spatially resolved sensor data.

13. The method according to claim 1, wherein the setting device exchanges data with the real-time evaluation device and/or the at least one sensor device via a wireless communication connection, and preferably at least in portions via a public network.

14. The method according to claim 1, wherein the real-time evaluation parameters and/or the test evaluation parameters are selected from a group comprising a variable characteristic of at least one ROI, of a sensor setting, of an evaluation accuracy, of a variable characteristic of at least one class of a container state, and similar.

15. A container inspection apparatus for inspecting containers, having at least one transport device configured for transporting containers to be inspected as a container stream along a predetermined transport path in a working mode, having at least one sensor device configured for detecting, in particular optically, spatially resolved sensor data with respect to a container to be inspected of the container stream in the working mode, and having a real-time evaluation device which is configured for evaluating the spatially resolved sensor data of the individual inspected containers in real time in the working mode with the aid of an adjustable set of real-time evaluation parameters, and with a non-volatile storage device, on which a plurality of the spatially resolved sensor data recorded by the sensor device are stored on a non-volatile storage device during the working mode, wherein, in a setting mode, the plurality of stored spatially resolved sensor data are retrieved by a setting device, wherein a set of test evaluation parameters can be provided to the setting device for evaluation with respect to use as a set of real-time evaluation parameters in the real-time evaluation device, wherein the setting device for evaluating the set of test evaluation parameters is configured for determining a statistical evaluation variable on the basis of the retrieved plurality of spatially resolved sensor data.

16. The container inspection apparatus according to claim 15, wherein the setting device is arranged at least partially locally separated with respect to the real-time evaluation device and/or the sensor device.

17. The container inspection apparatus according to claim 16, wherein the container inspection apparatus has a rejection device which is configured for rejecting an inspected container as a function of the evaluation carried out by the real-time evaluation device, and wherein the statistical evaluation variable is characteristic of a statistical rejection variable of the rejection device.

18. The container inspection apparatus according to claim 16, wherein the transport device is configured to transport the containers from a first treatment device to a second treatment device and preferably the first and/or the second treatment device is selected from a group comprising a cleaning device for cleaning the containers, a filling device for filling the containers, a forming device for forming a plastic preform into a plastic container, in particular a blow molding machine, a labeling device and similar, and a combination thereof.

19. The container inspection apparatus according to claim 15, wherein the container inspection apparatus has a rejection device which is configured for rejecting an inspected container as a function of the evaluation carried out by the real-time evaluation device, and wherein the statistical evaluation variable is characteristic of a statistical rejection variable of the rejection device.

20. The container inspection apparatus according to claim 15, wherein the transport device is configured to transport the containers from a first treatment device to a second treatment device and preferably the first and/or the second treatment device is selected from a group comprising a cleaning device for cleaning the containers, a filling device for filling the containers, a forming device for forming a plastic preform into a plastic container, in particular a blow molding machine, a labeling device and similar, and a combination thereof.

* * * * *